(12) United States Patent
Bolz

(10) Patent No.: US 6,580,277 B1
(45) Date of Patent: Jun. 17, 2003

(54) DEVICE FOR THE RATIOMETRIC MEASUREMENT OF SENSOR SIGNALS

(75) Inventor: Stephan Bolz, Pfatter (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/673,990

(22) PCT Filed: Apr. 1, 1999

(86) PCT No.: PCT/DE99/01019

§ 371 (c)(1),
(2), (4) Date: Jan. 8, 2001

(87) PCT Pub. No.: WO99/56085

PCT Pub. Date: Nov. 4, 1999

(30) Foreign Application Priority Data

Apr. 23, 1998 (DE) .......................... 198 18 309

(51) Int. Cl.⁷ .............................................. G01R 25/06
(52) U.S. Cl. ...................................................... 324/608
(58) Field of Search ................................. 324/608, 605, 324/606, 607, 714, 612–614; 341/155, 108

(56) References Cited

U.S. PATENT DOCUMENTS 4,841,227 A * 6/1989 Maier ........................ 324/61 R
5,028,874 A * 7/1991 Parle ........................... 324/608
5,515,048 A  5/1996 Honda et al. .................. 341/55
5,579,247 A * 11/1996 Kerth et al. ............. 364/571.02
5,684,407 A  11/1997 Zdanys, Jr. et al. ......... 324/714

FOREIGN PATENT DOCUMENTS

| DE | 196 29 747 A1 | 1/1998 |
| DE | 196 36 838 C1 | 1/1998 |
| DE | 196 35 162 A1 | 3/1998 |
| JP | 63-57851 A | 3/1988 |
| JP | 06 318 138 | 11/1994 |
| WO | WO 92/00504 | 1/1992 |

* cited by examiner

Primary Examiner—N. Le
Assistant Examiner—Amy He
(74) Attorney, Agent, or Firm—Laurence A. Greenberg; Werner H. Stemer; Gregory L. Mayback

(57) ABSTRACT

Device for the ratiometric measurement of sensor signals using an analog/digital converter whose supply voltage is generated by means of a voltage controller, having an operational amplifier which is connected as a voltage follower and whose noninverting input is supplied with the sensor reference voltage and whose output is connected to the supply voltage input via a voltage divider whose tap is fed back to the inverting input of the voltage follower.

3 Claims, 2 Drawing Sheets

US 6,580,277 B1

DEVICE FOR THE RATIOMETRIC MEASUREMENT OF SENSOR SIGNALS

BACKGROUND OF THE INVENTION

Field of the Inventiuon

The invention relates to a device for the rationmetric measurement of sensor signals.

The demands on the measurement accuracy of sensors in motor vehicle electronics are becoming ever higher. Many measured values are transmitted from the sensor to the processing microcontroller as analog DC voltages Vmeβ (0 ... 5V+0 ... 100%). The microcontroller digitizes them using an analog/digital converter ADC (e.g. 10 bit ADC: 0 ... 5V+0 ... 1023 steps). In an analog/digital converter, the measured voltage Vmeβ to be converted is set in relation to a reference value VAref, which is supplied to the analog/digital converter ADC as an analog reference voltage. To convert the analog value to a digital value as accurately as possible, it is therefore desirable for the sensor S and the analog/digital converter ADC to use the same reference voltage.

In motor vehicle electronics, this is generally not possible because the reference voltage VAref used for the analog/digital converter ADC integrated in the microcontroller µC is the supply voltage V5int for the microcontroller µC (VAref=V5int). Since, however, in the event of a short circuit between the sensor reference voltage V5ext and ground or the battery, the microcontroller and hence the engine/transmission control unit need to remain operational, the supply voltage V5int must not be routed to the vehicle wiring harness.

In this context, the notation V5int signifies the internal 5 volt supply voltage for the microcontroller µC, while V5ext signifies the 5 volt reference voltage for the sensor or sensors S arranged outside of the motor control unit ST. The supply voltage for microcontroller and sensors is usually 5 V.

A voltage controller SR having a plurality of mutually independent outputs—V5int, V5ext—and a common reference Ref is generally used, see FIG. 1. The mutual discrepancy (tracking error of the controller) which is possible in this context is typically V5int−V5ext=±50 ... 100 mV. In sensors such as air mass flowmeters, this error (1 ... 2%) is already an essential proportion of the total error budget.

SUMMARY OF THE INVENTION

It is therefore the object of the invention to provide a device for measuring sensor signals which can be used to eliminate or minimize this tracking error.

In the device according to the invention, the reference voltage VAref for the analog/digital converter ADC is isolated from the supply voltage V5int for the microcontroller µC. It follows—in a certain range around the supply voltage V5int—the sensor reference voltage V5ext, so that the tracking error is largely eliminated in this range. This range is defined by the maximum permissible difference between the reference voltage VAref for the analog/digital converter ADC and the supply voltage V5int for the microcontroller µC; in a typical microcontroller used in automobile electronics, it is ±100 V, for example.

An illustrative embodiment in accordance with the invention is explained in more detail below with the aid of a schematic drawing, in which:

DESCRIPTION OF THE PREFERRED EMBODIMENT

Figure 1:
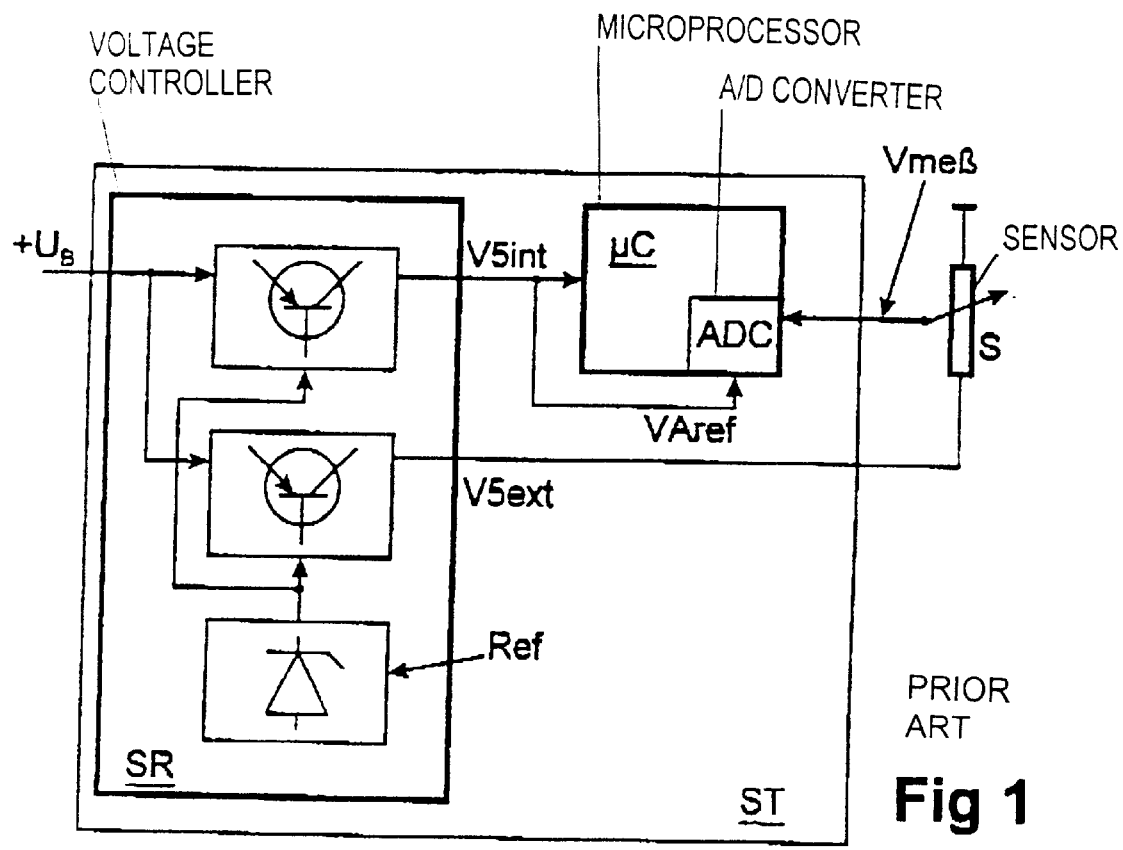
FIG. 1 shows a circuit used previously for measuring sensor signals.

FIG. 1 shows, in a previously used circuit, a motor control unit ST (indicated as a box) in a motor vehicle internal combustion engine (not shown), having an aforementioned voltage controller SR which is operated at the battery voltage+$U_B$, having two mutually independent outputs for the voltages V5int and V5ext and having a common reference Ref. The voltage V5int is used as the supply voltage for a microcontroller µC and at the same time as a reference voltage VAref for an analog/digital converter ADC which is integrated in to the microcontroller µC and which is supplied with the output signal Vmeβ from a sensor S which is in the form of a potentiometer and is arranged outside of the control unit ST, for the purpose of the ratiometric A/D conversion. The reference voltage V5ext received by the sensor S is the second output voltage from the voltage controller SR. As already described, this circuit has a tracking error between V5int and V5ext of, typically, ±50 ... 10 mV.

Figure 2:
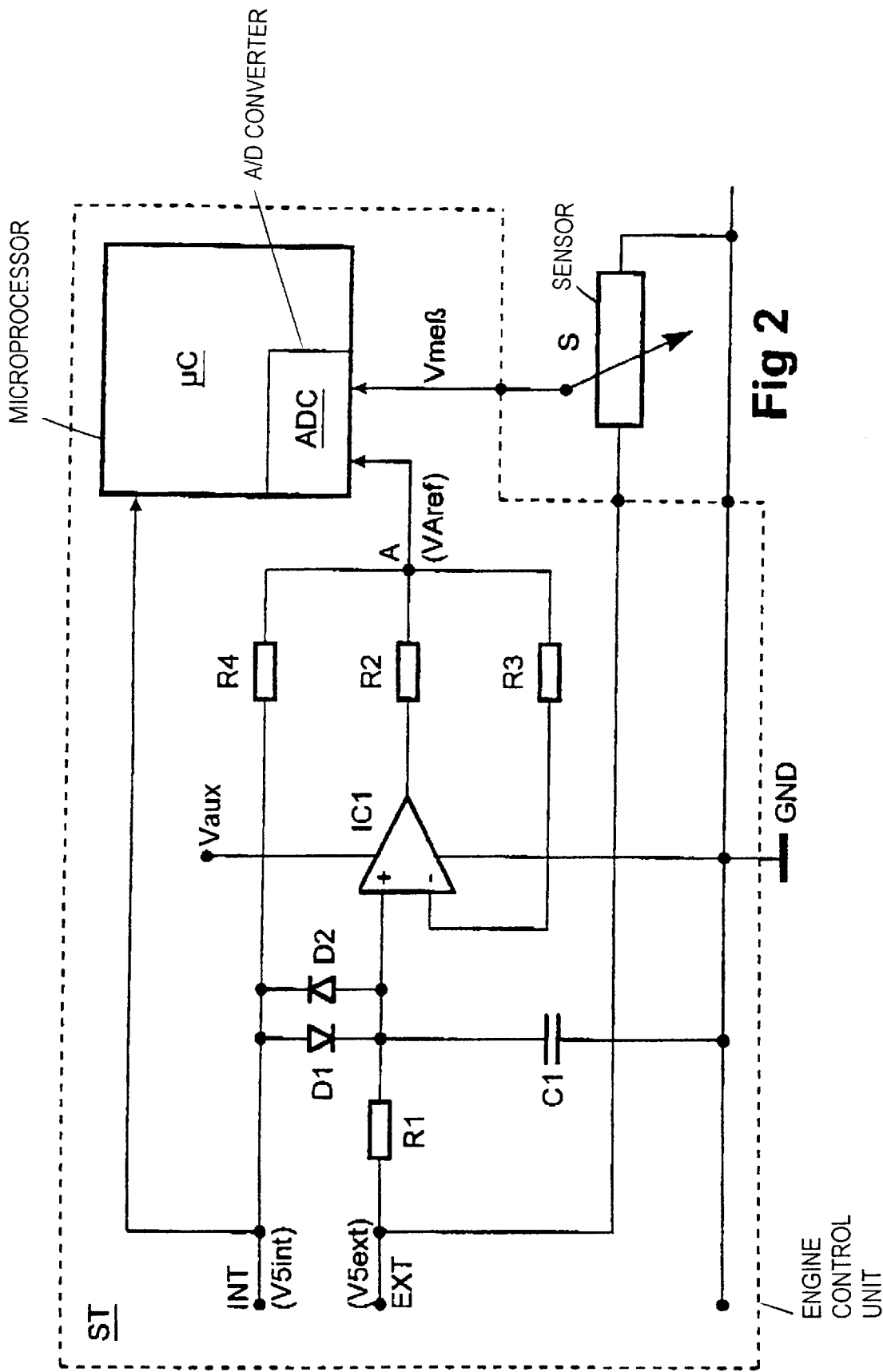
FIG. 2 shows a circuit according to the invention.

FIG. 2 shows an inventive circuit which eliminates this tracking error in a particular voltage range.

The engine control unit ST is indicated by a dashed line; although the voltage controller SR shown in FIG. 1 is also present in the engine control unit ST shown in FIG. 2, only its two voltage outputs are shown in this case as inputs for the circuit downstream, for the sake of clarity: INT for the supply voltage V5int for the internal microcontroller µC and EXT for the reference voltage V5ext for the external sensor S.

To form the reference voltage VAref for the analog/digital converter ADC, there is an operational amplifier IC1 which is connected as a voltage follower with a gain factor of +1 and is supplied with a voltage Vaux obtained from the vehicle battery. The noninverting input "+" of said operational amplifier is connected to the voltage input EXT via a resistor R1. The resistor R1 serves as protection for the operational amplifier IC1 against possible interference voltages which may be superimposed on the voltage V5ext.

The noninverting input "+" is first connected to the ground connection GND of the control unit ST via a capacitor C1. The capacitor C1 forms, together with the resistor R1, an additional low pass filter for filtering relatively high frequency interference. The noninverting input "+" is secondly connected to the voltage input INT via two reverse connected parallel diodes D1, D2, which means that the voltage (V5ext) applied to the noninverting input "+" is additionally limited to a voltage range V5int ±0.7 V.

The output of the operational amplifier IC1 is connected to the voltage input INT via a voltage divider which is formed from resistors R2 and R4 and whose tap A is connected to the inverting input "−" of the operational amplifier IC1 via a resistor R3. This tap A provides the reference voltage VAref, which is supplied to the analog/digital converter ADC together with the measured voltage Vmeβ tapped off at the sensor S.

The way in which this circuit operates, which is described below, is based on the voltages and component values specified below.

The voltage range at the output of the operational amplifier IC1 is approximately 0.4 V to 9.1 V for the assumed supply voltage of Vaux=10 V. The feedback via the resistor R3 causes the operational amplifier IC1 to attempt to eliminate the voltage difference between its inputs, i.e. to correct the voltage VAref, which is also applied to the inverting input, to the voltage V5ext applied to the noninverting input.

If, by way of example, the reference voltage V5ext has a tracking error of −100 mV with respect to the supply voltage V5int, which is intended to be exactly 5 V, i.e. V5ext=4.9 V (cf. FIG. 3, which plots the voltage curves for V5int, V5ext and VAref), then these 100 mV must be dropped across the resistor R4 so that the reference voltage VAref on the tap A of the voltage divider R4/R2 becomes equal to the reference voltage V5ext. The voltage divider ratio R2/R4 (20 kΩ/0.5 kΩ=40) then means that a voltage of 40*100 mV=4 V must be dropped across the resistor R2, however, i.e. the output of the operational amplifier IC1 is set to a voltage value of 0.9 V.

With the component values given below, the voltage divider and its connection to the supply voltage V5int via the input INT produce for the reference voltage VAref a range of approximately VAref=V5int (=5V) ±100 mV. In this range, the two voltages V5ext and VAref are of identical size: VAref=V5ext; ratiometric measurement in this range is therefore ensured. One possible error is still provided by the offset voltage of the operational amplifier IC1, which may be approximately ±1 . . . 10 mV, depending on the type used. However, this error is one order of magnitude smaller than the tracking error in previous solutions (±100 mV around V5int).

Figure 3:
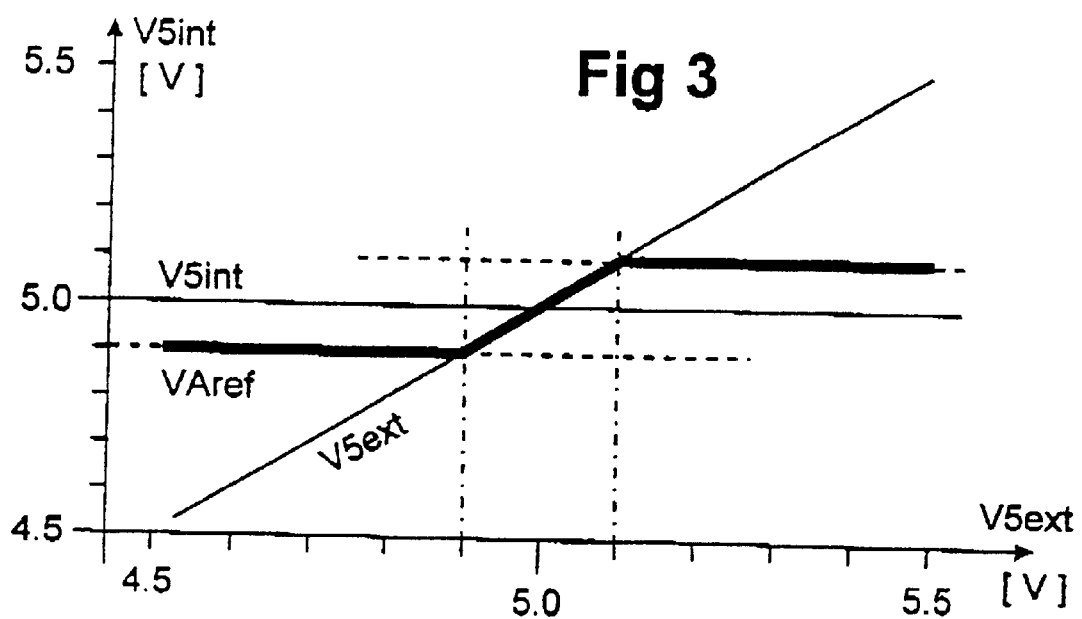
FIG. 3 shows a graph of the curve of the voltages used V5int, V5ext and VAref.

If the reference voltage V5ext becomes lower than 4.9 V or higher than 5.1 V, then VAref remains constant at approximately 4.9 V or 5.1 V, as shown in FIG. 3, since in this case the operational amplifier output has already reached its lower or upper limit value and a smaller or larger value cannot arise for VAref on account of the voltage divider ratio R2/R4.

In a preferred illustrative embodiment in accordance with FIG. 2, the following components and voltages are used:

D1, D2: DIN4148 R1: 10 kΩ V5int: 5V
C1: 1nF R2: 20 kΩ V5ext: 5 V
IC1: LM324 R3: 10 kΩ Vaux: 10V
R4: 0.5 kΩ

I claim:

1. A device for ratiometric measurement of sensor signals, comprising:

a supply input for receiving a supply voltage;

an analog/digital converter connected to said supply input to receive the supply voltage, said analog/digital converter connected to receive a first reference voltage;

a sensor for providing an analog output signal that is supplied to said analog/digital converter, said sensor connected to receive a second reference voltage;

a voltage controller supplying the supply voltage to said supply input, and supplying, independently from the supply voltage, the second reference voltage;

a first resistor connected to receive the second reference voltage;

a voltage divider including a second resistor, a third resistor, and a voltage tap between said second resistor and said third resistor;

a fourth resistor connected to said voltage tap of said voltage divider; and an operational amplifier that is connected as a voltage follower for forming the first reference voltage;

said operational amplifier having a noninverting input connected to said first resistor to receive the second reference voltage, said operational amplifier having an output connected through said voltage divider to said supply input;

said operational amplifier having an inverting input connected through said fourth resistor to said voltage tap of said voltage divider; and said voltage tap of said voltage divider providing the first reference voltage.

2. The device according to claim 1, comprising a low pass filter is connected upstream of said noninverting input of said operational amplifier.

3. The device according to claim 1, which comprises two reverse connected parallel diodes connecting said noninverting input of said operational amplifier to said supply input.

* * * * *